July 22, 1941.  R. E. HULSE  2,249,765
ELECTRICAL CONTACT IN ELECTROLYTIC CELLS
Filed July 6, 1937
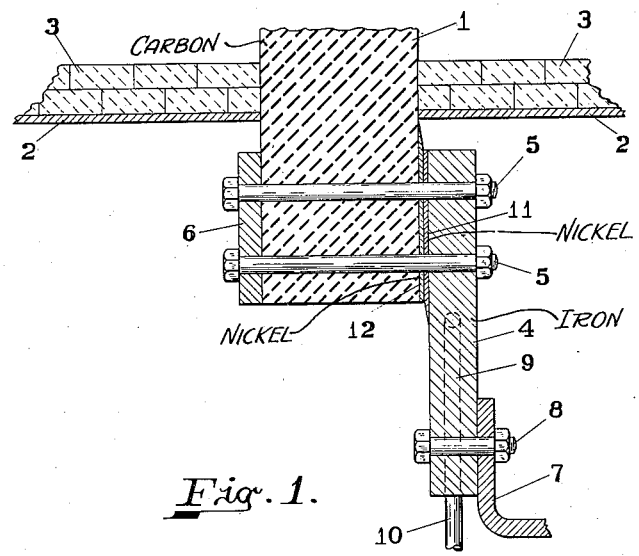
Fig. 1.
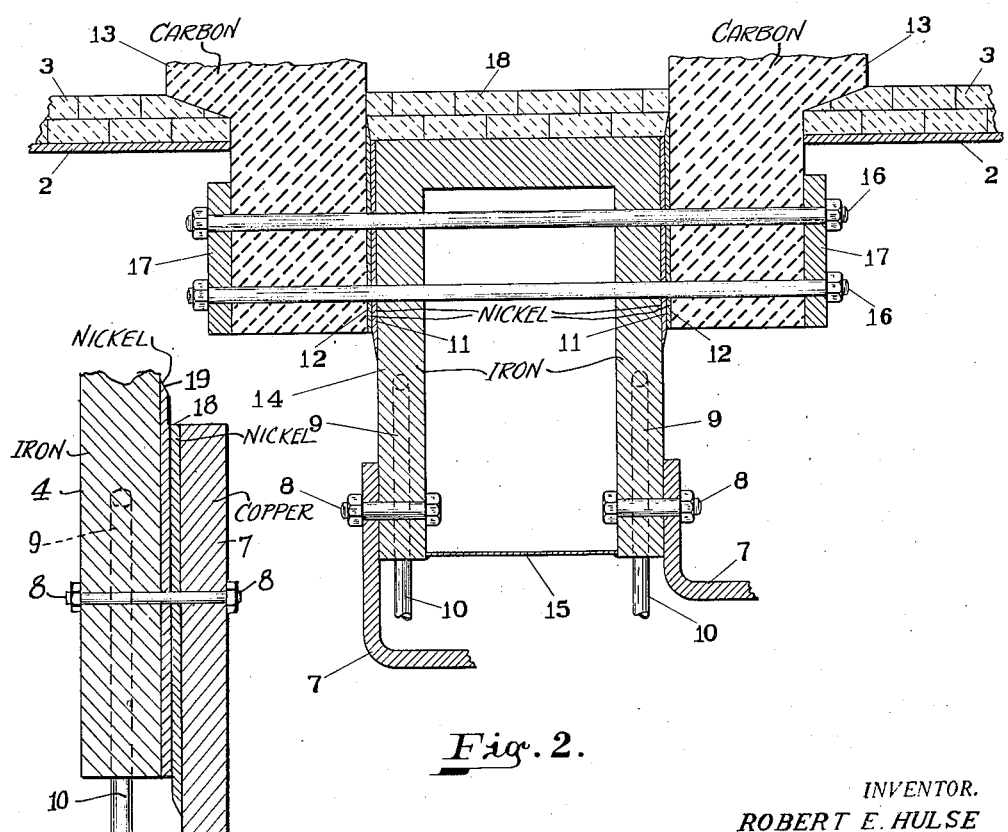
Fig. 2.
Fig. 3.
INVENTOR.
ROBERT E. HULSE
BY Theodore F. Budrow
ATTORNEY.

Patented July 22, 1941

2,249,765

UNITED STATES PATENT OFFICE 2,249,765

ELECTRICAL CONTACT IN ELECTROLYTIC CELLS

Robert Edwin Hulse, Niagara Falls, N. Y., assignor to E. I. du Pont de Nemours & Company, Wilmington, Del., a corporation of Delaware Application July 6, 1937, Serial No. 152,245

9 Claims. (Cl. 204—243)

This invention relates to apparatus for electrolysis of fused salts and, more particularly, to electrical contacts for such apparatus.

In fused salt electrolysis it is common to utilize electrodes made of carbon or graphite; these are ordinarily used as anodes, e. g., in the electrolysis of fused halides where the anodic product is a halogen gas. The carbon or graphite electrodes may extend out the top, side or bottom of the cell, depending upon the particular type of cell construction utilized. In a well known type of cell used for electrolyzing alkali metal halides to produce alkali metal and halogen gas, the anode is of graphite, centrally located and extends out the bottom of the cell. The electrical current passed through such graphite or carbon electrodes ordinarily is of high amperage and is brought to the cell in heavy bus bars of conductive metal such as copper or aluminum. Since such electrolytic cells commonly are operated at high temperatures such as 400 to 800° C., the portion of the electrode protruding from the cell is highly heated and would cause severe oxidation and rapid destruction of a bus bar connected directly thereto. This problem has been overcome heretofore by providing means for water cooling the electrical connections to reduce the temperature so that excessive oxidation at the point of connection will not occur. However, this form of construction is generally unsatisfactory for fused salt electrolysis cells since water cooling would tend to extract relatively large amounts of heat from the cell, lowering the cell efficiency, since the heat extracted must be made up by electrical energy fed to the cell. Moreover, even with adequate cooling, sufficient oxidation ordinarily occurs to cause a substantial resistance or voltage-drop at the point of contact with the electrode, which further decreases the efficiency of the system.

An object of the present invention is to provide an improved type of electrical contact with a graphite or carbon electrode in a fused salt electrolysis cell. Another object is to decrease the resistance or voltage-drop at the electrical contact with the graphite or carbon electrode in a fused salt electrolysis cell. A further object is to provide a means for electrical contact in such cells which means avoids excessive cooling of the contact members. Further objects will be apparent from the following description of the invention.

Figures 1, 2 and 3 of the appended drawing are sectional views to illustrate the present invention. Figure 1 is a fragmentary sectional view showing a graphite electrode extending from the bottom of a fused salt electrolytic cell, with connections to a source of electricity. Figure 2 is a similar sectional view showing a multiple type graphite electrode made of a plurality of graphite elements, the multiple electrode extending out of the bottom of the cell, with connections to a source of electrical energy. Figure 3 is a fragmentary sectional view having metal layers interposed between the bus bar and the steel contact plate. Referring to Figure 1, graphite electrode 1 extends through the bottom of an electrolytic cell The bottom of the cell consists of steel shell 2 together with a fire brick lining 3 adapted to prevent contact of the electrolyte with the shell 2. The graphite electrode 1 may be cylindrical, square, rectangular or other shape, as desired. On a portion of the electrode 1 which extends outside of the cell, a steel or cast iron contact plate 4 is held in tight contact with the electrode 1 by means of bolts 5 together with washer or backing plate 6. The contact plate 4 may be made of rolled steel, cast steel, cast iron or similar ferrous metal. Bus bar 7 is bolted to the contact plate 4 by means of bolt 8. In one modification contact plate 4 is provided with passages 9 for water cooling in the region at which the bus bar 7 is fastened thereto, the water cooling passages 9 being connected to a source of water by way of inlet pipe 10 and a suitable outlet pipe not shown. Elements 11 and 12 represent metal layers adherent to the contact plate 4 and electrode 1, respectively, for the purpose of securing better electrical contact between the graphite and the contact plate. The metal layers 11 and 12, which may be 0.002 to 0.01 inch thick, are shown in the drawing in greatly magnified form, for the sake of better illustration. In the preferred modification of my invention I first coat the graphite or carbon electrode with a layer of a metal which is resistant to oxidation, e. g. nickel, at the point where the contact plate is to be fastened. I likewise coat contact plate 4 with the same or a similar metal on that portion of its surface which is to come in contact with the electrode 1. The contact plate and electrode are then bolted together so as to provide good electrical contact.

Referring to Figure 2, a multiple type electrode is made up of a number of graphite or carbon elements 13 which are bolted to a so-called "center block" 14, the portion of the electrodes 13 which are fastened to the center block extending outside of the cell. The drawing shows the multiple type electrode extending through the bottom of a fused salt electrolysis cell, which bottom consists of a steel shell 2 lined with fire brick 3. The center block 14 as shown in the drawing is a cast steel or cast iron hollow block closed at its lower end by means of a steel plate 15 welded in place. The shape of the horizontal cross section of the center block 14 will vary depending upon the desired shape of the composite electrode and the number of graphite elements 13 used to make up the electrode. For example, in one modification the horizontal cross section of the center block 14 may be an octagon and have 8 graphite elements 13 fastened to the 8 sides thereof. The graphite elements 13 are fastened securely to the center block by means of bolts 16 and washers or backing plates 17. Preferably the space above the center block 14 is filled to a suitable height with fire brick sealed in place to prevent contact of the electrolyte in the cell with the top of the center block. At the lower end of center block 14, which extends some distance below the graphite electrodes 13, one or more bus bars 7, as may be required to conduct the electrical current used, are securely fastened to the center block by means of bolts 8. In the region surrounding each connection to bus bars 7, center block 14 is provided with interior passages 9 for cooling water. Water inlet pipes 10 are connected with the water cooling passages 9 and suitable water outlet pipes not shown are provided. The surface of the center block 14 which comes in contact with the electrodes 13 is coated with an adherent thin layer 11 of a corrosion resistant metal, e. g. nickel. The surface of electrodes 13 which come in contact with the center block are coated with layer 12 of the same or a similar metal, as hereinafter more fully described.

Referring to Figure 3, bus bar 7 is bolted to the contact plate 4 by means of bolt 8. In one modification, contact plate 4 is provided with passage 9 for water cooling in the region at which bus bar 7 is fastened thereto, the water cooling passage 9 being connected to a source of water by way of inlet pipe 10 and a suitable outlet pipe not shown. The contact plate 4 may be made of rolled steel, cast steel, cast iron or similar ferrous metal. Elements 18 and 19 represent metal layers adherent to the bus bar 7 and the contact plate 4, respectively, for the purpose of securing a better electrical contact between the bus bar and the contact plate. The metal layers 18 and 19, which may be .002 to .003 inch thick, are shown in the drawing in greatly magnified form for the sake of better illustration.

The metal layers 11 and 12 as shown in Figures 1 and 2 of the above drawing form an important feature of my invention. As stated, these layers consist of a metal which is resistant to oxidation. For this purpose, I prefer to coat the surfaces with nickel layers; however, the invention is not restricted to the use of nickel layers but other corrosion resistant metals may be used, for example, various corrosion resistant nickel alloys such as Monel metal, chromium or chromium plated nickel layers or other oxidation resistant metals or alloys which will be evident to skilled engineers. For the purposes of my invention, it is essential that the layer of oxidation resistant metal be firmly adhered to the iron or steel contact plate 4 of Figure 1 (or the center block 14 of Figure 2) and likewise that the metal layer 12 be tightly adherent to the graphite electrode. If desired, the metal layer may be placed upon the steel contact plate only, thus using a single metal layer. However, I have found that far superior results are obtained by using the two metal layers, that is by first coating both the graphite and the steel plate or center block each with a layer of nickel or other oxidation resistant metal and then bolting the two clean metal surfaces together. In this way, I am able to secure an electrical contact which offers substantially no resistance to the flow of electric current (except for the resistance of the metal itself) and which suffers no substantial change in its conductivity throughout a long period of use at high temperatures.

The method of applying the metal layer to the graphite and to the iron or steel connection is also an important feature of this invention. I have discovered that the most satisfactory results are obtained by using a "metal spraying process" to produce the metal layers on the graphite and on the steel. This is especially true as regards the coating of the graphite. I have found that if the metal is coated on the graphite by electrolytic deposition, the salts from the electroplating bath tend to penetrate into the graphite and their presence in the graphite tends to cause the latter to crack and break off under the conditions of the fused salt electrolysis. Furthermore, the metal spraying method provides the closely adherent contact which is essential for good electrical conductivity between the metal layer and the graphite or steel, as the case may be. The metal spraying process to which I refer is exemplified by the method widely known as the "Schoop metallizing process." In this process, a wire of the desired coating metal is fed into the flame of an especially constructed gas burner, in such manner that the wire is melted in the flame and the molten metal is atomized by the force of the combustion gas so as to blow out a stream of finely atomized metal. The stream of atomized metal is directed against the surface to be coated. The resulting coating is highly adherent to the surface, is strong and dense and well suited as an electrical conductor. In producing a metal layer by this method for the purpose of my invention, it is preferable to previously roughen the surface of the steel or graphite, for example by means of a sand blast. The steel surface of course should be thoroughly cleaned of all oxide, grease, or other foreign material before applying the metal coating. After the metal coating is applied, it may be smoothed down, if desired; but ordinarily that is not necessary since a smooth coating may be obtained by the metal spraying method. The thickness of the metal coating may vary widely as may be desired. Ordinarily it is not necessary to have the thickness more than 0.006 inch in depth; thicker coatings, e. g. up to ½" may be used if desired. As regards the thickness, it is only necessary to insure that complete coverage of the graphite or steel is obtained so that substantially no irregularities of the base metal extend above the surface of the metal coating.

Another feature of my invention resides in connecting the bus bars to the iron or steel contact plate or center block at a sufficient distance from the point of contact of the latter with the graphite electrode so that excessive temperatures will not be reached at the point of contact with the bus bar. The distance between the bus bar and the graphite electrode necessarily will vary widely depending upon the particular construction utilized and the temperature developed in the electrolytic cell. This distance also will vary depending on whether cooling means are applied to the iron or steel contact plate at or near the point where the bus bar is connected. In a construction with no cooling applied at any point, in an electrolytic cell operating at temperatures around 400–600° C., for example, the distance between the bus bar and the graphite electrode usually will be in the neighborhood of 2 to 5 feet. With this arrangement, little or no oxidation of the bus bar will occur at the point of contact with the steel and substantially no oxidation, warping or other damage to the bus bar will occur at or near the bus bar connection. Because of the relatively low coefficient of heat conductivity of the iron, the temperature at the bus bar connection will not exceed about 100° C. Under the same conditions a somewhat shorter distance may be used by providing means for cooling the steel contact plate in the neighborhood of its connection with the bus bar; for example, water cooling means as shown by elements 9 and 10 of the appended drawing. Such cooling means, which are spaced some distance from the electrode, do not extract any material amounts of heat from the cell, because of the relatively low heat conductivity of the cast iron or steel block.

If desired, metal layers like those illustrated by elements 11 and 12 of the drawing also may be interposed between the bus bars and the steel contact plates as is illustrated by Figure 3. By the use of interposed layers of oxidation resistant metals at this point, the formation of an oxide layer by reason of any slight oxidation of the bus bar which would cause a voltage drop between the bus bar and the steel may be completely avoided.

My invention is not restricted to the particular arrangement of apparatus shown in the drawing and described above since that is given here merely by way of illustration of my invention. The essential features of the invention reside in an electrical connection to a graphite or carbon electrode of a fused salt electrolysis cell, which connection comprises a ferrous metal member coated with an oxidation resistant metal and firmly attached to a graphite or carbon electrode and an electrical conductor such as a copper or aluminum bus bar or cable attached to the said ferrous metal member at another point and at such distance from the graphite electrode that the temperature at the bus bar connection will be sufficiently low to avoid damage to the bus bar. Preferably the arrangement is such that a temperature at the bus bar connection does not exceed 100° C. in the normal operation of the electrolysis cell to which the device is applied. If the bus bar and contact plates are provided with the oxidation resistant metal coating at the bus bar connection as shown in Figure 3, the temperature may rise above 100° C. at this point. However, in any event, I prefer to maintain the temperature at the bus bar connection not higher than around 250° C.

I claim:

1. In a fused salt electrolysis cell having a carbonaceous electrode, an electrical connection to said electrode comprising an iron or steel member fastened to said electrode and an electrical terminal connected to said member at a point removed from the point of connection to said electrode, said member being provided with an adherent layer of a metal selected from the group consisting of nickel, chromium, and Monel metal, at the point of contact with the carbonaceous surface of said electrode, said layer of metal being directly in contact with said member.

2. In a fused salt electrolysis cell having a carbonaceous electrode, an electrical connection to said electrode comprising an iron or steel member fastened to said electrode and an electrical terminal connected to said member at a point removed from the point of connection to said electrode, said member being provided with an adherent layer of nickel at the point of contact with the carbonaceous surface of said electrode, said layer of nickel being directly in contact with said member.

3. In a fused salt electrolysis cell having a carbonaceous electrode, an electrical connection to said electrode comprising an iron or steel member fastened to said electrode and a bus bar connected to said member at such distance from connection to said electrode that the temperature at the bus bar connection does not rise above about 100° C. during normal operation of said cell, said electrode and said member each being provided with an adherent layer of a metal selected from the group consisting of nickel, chromium and Monel metal at their point of contact, one of said layers of metal being directly in contact with said electrode and the other of said layers being directly in contact with said member.

4. In a fused salt electrolysis cell having a carbonaceous electrode, an electrical connection to said electrode comprising an iron or steel member fastened to said electrode and a bus bar connected to said member at such distance from connection to said electrode that the temperature at the bus bar connection does not rise above about 100° C. during normal operation of said cell, said electrode and said member each being provided with an adherent layer of nickel at their point of contact, one of said layers of nickel being directly in contact with said electrode and the other of said layers being directly in contact with said member.

5. The apparatus according to claim 3 which is additionally provided with means for cooling said iron or steel member at a point in close proximity to the bus bar connection.

6. A method for making an electrical connection between a carbonaceous electrode in a fused salt electrolysis cell and an iron or steel member which comprises applying an adherent layer of a metal selected from the group consisting of nickel, chromium, and Monel metal, directly onto said electrode, applying an adherent metal layer selected from the group consisting of nickel, chromium, and Monel metal, directly onto said member, and applying pressure to hold the surfaces of the two said metal layers in contact.

7. A method for making an electrical connection between a graphite electrode in a fused salt electrolysis cell and an iron or steel member which comprises applying an adherent layer of nickel directly onto said electrode, applying an adherent nickel layer directly onto said member, and applying pressure to hold the surfaces of the two said nickel layers in contact.

8. A method for making an electrical connection between an iron or steel member and a graphite electrode in a fused salt electrolysis cell which comprises applying an adherent layer of a metal selected from the group consisting of nickel, chromium, and Monel metal directly onto said iron or steel member and then applying pressure to hold the surface of said metal layer directly against said electrode.

9. A method for making an electrical connection between an iron or steel member and a graphite electrode in a fused salt electrolysis cell which comprises applying an adherent layer of nickel onto said member and then applying pressure to hold the surface of said nickel layer directly against said electrode.

ROBERT EDWIN HULSE.